United States Patent
Hirai

(10) Patent No.: US 10,022,716 B2
(45) Date of Patent: Jul. 17, 2018

(54) METHOD FOR PRODUCING IONIC POLYMER MEMBRANE

(71) Applicant: Asahi Glass Company, Limited, Tokyo (JP)

(72) Inventor: Takeshi Hirai, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 588 days.

(21) Appl. No.: 14/672,829

(22) Filed: Mar. 30, 2015

(65) Prior Publication Data

US 2015/0202617 A1 Jul. 23, 2015

Related U.S. Application Data

(63) Continuation of application No. PCT/JP2013/079635, filed on Oct. 31, 2013.

(30) Foreign Application Priority Data

Nov. 14, 2012 (JP) ................. 2012-250143

(51) Int. Cl.
*B01J 47/12* (2017.01)
*C08J 5/22* (2006.01)
(Continued)

(52) U.S. Cl.
CPC .......... *B01J 47/12* (2013.01); *C08J 5/2237* (2013.01); *H01M 8/103* (2013.01); *H01M 8/109* (2013.01);
(Continued)

(58) Field of Classification Search
None
See application file for complete search history.

(56) References Cited

U.S. PATENT DOCUMENTS

| | | |
|---|---|---|
| 2002/0002240 A1 | 1/2002 | Michot et al. |
| 2002/0160272 A1* | 10/2002 | Tanaka ............... B01D 67/0088 |
| | | 429/314 |
| 2013/0053459 A1 | 2/2013 | Tayanagi et al. |

FOREIGN PATENT DOCUMENTS

| | | |
|---|---|---|
| JP | 2002-324559 | 11/2002 |
| JP | 2011-40363 | 2/2011 |

(Continued)

OTHER PUBLICATIONS

U.S. Appl. No. 13/563,978, filed Aug. 1, 2012, US2013/0053459 A1, Tayanagi, et al.

(Continued)

*Primary Examiner* — Sarah A. Slifka
(74) *Attorney, Agent, or Firm* — Oblon, McClelland, Maier & Neustadt, L.L.P.

(57) ABSTRACT

To provide a simple method whereby an ionic polymer membrane having a high ion exchange capacity and a low water uptake can be produced by converting a —$SO_2F$ group in a polymer to a pendant group having multiple ion exchange groups, while preventing a cross-linking reaction. At the time of obtaining an ionic polymer membrane by converting —$SO_2F$ (group (1)) in a polymer sequentially to —$SO_2NZ^1Z^2$ (group (2)), —$SO_2N^-(M_\alpha^+)SO_2(CF_2)_2SO_2F$ (group (3)), —$SO_2N^-(H^+)SO_2(CF_2)_2SO_2F$ (group (4)) and —$SO_2N^-(M_\beta^+)SO_2(CF_2)_2SO_3^-M_\beta^+$ (group (5)), the polymer is formed into a polymer membrane in the state of any one of the groups (1) to (4), and the polymer membrane is thermally treated in the state of group (4). Here, $Z^1$ and $Z^2$ are hydrogen atoms, etc., $M_\alpha^+$ is a monovalent cation, and $M_\beta^+$ is a hydrogen ion or a monovalent cation.

9 Claims, 3 Drawing Sheets

(51) Int. Cl.
*H01M 8/1088* (2016.01)
*H01M 8/103* (2016.01)
*H01M 8/1032* (2016.01)
*H01M 8/1037* (2016.01)
*H01M 8/1039* (2016.01)
*H01M 8/1072* (2016.01)
*H01M 8/1086* (2016.01)
*H01M 8/1018* (2016.01)

(52) U.S. Cl.
CPC ....... *H01M 8/1032* (2013.01); *H01M 8/1037* (2013.01); *H01M 8/1039* (2013.01); *H01M 8/1072* (2013.01); *H01M 8/1088* (2013.01); *C08J 2341/00* (2013.01); *H01M 2008/1095* (2013.01); *Y02P 70/56* (2015.11)

(56) References Cited

FOREIGN PATENT DOCUMENTS

| JP | 2011-140605 A | 7/2011 |
| WO | WO 2011/129967 A2 | 10/2011 |

OTHER PUBLICATIONS

International Search Report issued in International Application No. PCT/JP2013/079635, dated Feb. 4, 2014.
J.S. Wainright et al.; Proceedings-Electrochemical Society, 94-23; 1994, p. 265.
U.S. Department of Energy Hydrogen Program 2010 Annual Merit Review & Peer Evaluation, Lecture, No. FC034.

* cited by examiner

METHOD FOR PRODUCING IONIC POLYMER MEMBRANE

TECHNICAL FIELD

The present invention relates to a method for producing an ionic polymer membrane, and methods for producing an electrolyte membrane, catalyst layer and membrane/electrode assembly for a polymer electrolyte fuel cell.

BACKGROUND ART

As an electrolyte material contained in an ion exchange membrane, an electrolyte membrane for a polymer electrolyte fuel cell, etc., for example, an ionic polymer is known wherein one pendant group (or a side chain) has multiple ion exchange groups such as sulfonic acid groups ($-SO_3H^+$ groups), sulfonimide groups ($-SO_2N^-(H^+)-$ groups), etc. Such an ionic polymer is less susceptible to swelling with water even when its ion exchange capacity is made high, and thus has good dimensional stability, as compared with an ionic polymer wherein one pendant group has one ion exchange group.

As methods for producing an ionic polymer membrane wherein one pendant group has multiple ion exchange groups, for example, the following methods (1) to (4) are known.

Method (1): A method of synthesizing a monomer wherein one pendant group has multiple ion exchange groups, and polymerizing such a monomer with e.g. tetrafluoroethylene (hereinafter referred to as TFE) (see Non-patent Document 1).

Method (2): A method comprising the following steps (X1) to (X3) (see Patent Document 1).

(X1) a step of converting a $-SO_2F$ group in a polymer having the $-SO_2F$ group, to a $-SO_2NH_2$ group.

(X2) a step of reacting the resulting polymer having the $-SO_2NH_2$ group, with $FSO_2(CF_2)_3SO_2F$ to convert part of the $-SO_2NH_2$ group to $-SO_2N^-H^+SO_2(CF_2)_3SO_2F$ group, while cross-linking the $-SO_2NH_2$ group to each other.

(X3) a step of converting the $-SO_2N^-H^+SO_2(CF_2)_3SO_2F$ group to a $-SO_2N^-H^+SO_2(CF_2)_3SO_3^-H^+$ group.

Method (3): A method comprising the following steps (Y1) to (Y3) (see Patent Document 1).

(Y1) a step of converting a $-SO_2F$ group in a polymer having the $-SO_2F$ group, to a $-SO_2NH_2$ group.

(Y2) a step of reacting the resulting polymer having the $-SO_2NH_2$ group, with $FSO_2(CF_2)_3I$ to convert the $-SO_2NH_2$ group to a $-SO_2N^-H^+SO_2(CF_2)_3I$ group.

(Y3) a step of converting the $-SO_2N^-H^+SO_2(CF_2)_3I$ group to a $-SO_2N^-H^+SO_2(CF_2)_3SO_3^-H^+$ group.

Method (4): A method comprising the following steps (Z1) and (Z2) (see Non-patent Document 2 and Patent Document 2).

(Z1) a step of reacting a polymer having a $-SO_2NH_2$ group, with an excess amount of a compound having at least two $-SO_2F$ groups exemplified by $FSO_2(CF_2)_nSO_2F$, to convert the $-SO_2NH_2$ group to a $-SO_2N^-H^+SO_2(CF_2)_n SO_2F$ group.

(Z2) a step of converting the $-SO_2N^-H^+SO_2(CF_2)_nSO_2F$ group to a $-SO_2N^-H^+SO_2(CF_2)_nSO_3H^+$ group.

PRIOR ART DOCUMENTS

Patent Documents

Patent Document 1: JP-A-2002-324559
Patent Document 2: WO2011/129967

Non-Patent Documents

Non-patent Document 1: Proceedings-Electrochemical Society, 94-23, 1994, p. 265
Non-patent Document 2: U.S. Department of Energy Hydrogen Program 2010 Annual Merit Review & Peer Evaluation, Lecture No. FC034

DISCLOSURE OF INVENTION

Technical Problems

However, Method (1) has the following problems.

(a) The monomer having such a pendant group has a high boiling point, and it is difficult to purify the monomer by distillation.

(b) The monomer having such a pendant group is water-soluble and hardly soluble in a fluorinated solvent, whereby solution polymerization in a fluorinated solvent is difficult, and the polymerization method is restricted.

(c) If it is attempted to convert unstable terminals of the obtained polymer by fluorine gas to stabilized terminals, ion exchange groups are likely to be reacted with fluorine, whereby it is difficult to maintain ion exchange groups, and it is difficult to obtain adequate durability.

Method (2) has the following problems.

The obtained polymer substantially has cross-linkages and thus is poor in solubility in a solvent. Accordingly, it is difficult to prepare a solution of the polymer, and it is difficult to make a thin electrolyte membrane by a coating method such as a casting method.

Whereas, the polymer obtainable by Method (3) has no cross-linkage. However, the polymer obtainable by Method (3) has the following problems.

$FSO_2(CF_2)_3I$ is difficult to synthesize.

In step (Y3), the terminal is required to be converted to a $-SO_3^-H^+$ group, but such a reaction is cumbersome and cannot be regarded as practical, since e.g. an iodine compound having a large molecular weight is produced as a by-product in a large amount.

Also, the polymer obtainable by Method (4) has no cross-linkage. However, Method (4) has the following problems.

$SO_2F$ groups at both sides of $FSO_2(CF_2)_nSO_2F$ may be reactive, and therefore, in order to prevent cross-linking to the $-SO_2NH_2$ group in the polymer, it is necessary to add an excess amount of $FSO_2(CF_2)_nSO_2F$.

That is, in Non-patent Document 2, it is disclosed that it is possible to prevent cross-linking substantially by using $FSO_2(CF_2)_3SO_2F$. However, there is no disclosure as to how much amount is reacted.

Further, in Example 1 in Patent Document 1, cross-linking by such a compound is carried out, and therefore, in order to carry out the reaction while preventing the cross-linking, it is necessary to add such a compound excessively. Furthermore, in an Example in Patent Document 2, a polymer which can be made into a solution is obtained by adding $FSO_2(CF_2)_3SO_2F$ in such a large excess amount as 7.9 equivalents to the $-SO_2NH_2$ group.

Thus, if it is attempted to obtain the polymer with no cross-linkage by Method (4), economical efficiency deteriorates.

Further, $FSO_2(CF_2)_3SO_2F$ to be used in Method (2) and Method (4) is synthesized, for example, by converting terminals of $I(CF_2)_3I$ to $SO_2F$ groups. $I(CF_2)_3I$ is synthesized by a method of adding TFE to $ICF_2I$ (J. Org. Chem., 2004, Vol. 69, No. 7, p. 2394, etc.). However, by such a method, I(CF$_2$)$_2$I, I(CF$_2$)$_4$I, etc. are produced as by-products, whereby purification is difficult. Especially, if FSO$_2$(CF$_2$)$_4$SO$_2$F is contained as an impurity, as described later, since the reactivity of functional groups at both terminals of such FSO$_2$(CF$_2$)$_4$SO$_2$F is equal, there will be problems such that gelation is likely to occur, and the water uptake of the polymer tends to be excessively high.

Further, FSO$_2$(CF$_2$)$_3$SO$_2$F can be synthesized by a method of subjecting FSO$_2$(CH$_2$)$_3$SO$_2$F to electrolytic fluorination. However, the synthesis of FSO$_2$(CH$_2$)$_3$SO$_2$F requires many steps, and the yield is not high enough, and thus can hardly be regarded as practical. Further, the yield in the electrolytic fluorination is also low, and impurities not sufficiently fluorinated tend to remain, whereby purification is very difficult. Accordingly, if the obtained ionic polymer is employed as an electrolyte material for a fuel cell, durability may not adequately be attained.

The present invention is to provide a method for producing an ionic polymer membrane, whereby a —SO$_2$F group in a polymer can be converted to a pendant group having multiple ion exchange groups by a simple method while preventing a cross-linking reaction, and as a result, it is possible to obtain an ionic polymer membrane having a high ion exchange capacity and a low water uptake, and to provide methods for producing an electrolyte membrane, catalyst layer and membrane/electrode assembly for a polymer electrolyte fuel cell.

Solution to Problems

The method for producing an ionic polymer membrane of the present invention is characterized by comprising the following steps (A) to (F):

(A) a step of converting a group represented by the following formula (1) in a polymer (i) having a constituent unit having the group represented by the formula (1), to a group represented by the following formula (2) to form a polymer (ii), (B) a step of reacting the polymer (ii) with a compound represented by the following formula (a) to convert the group represented by the formula (2) in the polymer (ii) to a group represented by the following formula (3) to form a polymer (iii), (C) a step of converting the group represented by the formula (3) in the polymer (iii) to a group represented by the following formula (4) to form a polymer (iv), (D) a step of forming a polymer membrane which contains the polymer (i), prior to the step (A), or forming a polymer membrane which contains the polymer (ii), between the step (A) and the step (B), or forming a polymer membrane which contains the polymer (iii), between the step (B) and the step (C), or forming a polymer membrane which contains the polymer (iv), between the step (C) and the following step (E), (E) a step of thermally treating the polymer membrane containing the polymer (iv), subsequent to the step (C) and between the step (D) and the following step (F), (F) a step of converting the group represented by the formula (4) in the polymer (iv) to a group represented by the following formula (5) to form a polymer (v), thereby to obtain an ionic polymer membrane which contains the polymer (v);

—SO$_2$F  (1)

—SO$_2$NZ$^1$Z$^2$  (2)

FSO$_2$(CF$_2$)$_2$SO$_2$F  (a)

—SO$_2$N$^-$(M$_\alpha^+$)SO$_2$(CF$_2$)$_2$SO$_2$F  (3)

—SO$_2$N$^-$(H$^+$)SO$_2$(CF$_2$)$_2$SO$_2$F  (4)

—SO$_2$N$^-$(M$_\beta^+$)SO$_2$(CF$_2$)$_2$SO$_3^-$M$_\beta^+$  (5)

wherein each of Z$^1$ and Z$^2$ which are independent of each other, is a group selected from the group consisting of a hydrogen atom, a monovalent metal element and Si(R)$_3$, R is a hydrogen atom, or a C$_{1-12}$ monovalent organic group which may have an etheric oxygen atom, and three R may be the same or different groups one another, M$_\alpha^+$ is a monovalent metal cation, or a monovalent cation derived from an organic amine, and M$_\beta^+$ is an hydrogen ion, a monovalent metal cation, or a monovalent cation derived from an organic amine.

The group represented by the formula (2) is preferably —SO$_2$NH$_2$.

In the step (B), the amount of the compound (a) to be used, is preferably from 0.5 to 20 by molar ratio to the group represented by the formula (2) in the polymer (ii).

Further, the step (D) for forming a polymer membrane is preferably a casting method or a thermoforming method.

In the step (E), the polymer membrane is preferably thermally treated at a temperature of at most 160° C.

The polymer (i) is preferably a perfluorinated polymer.

The method for producing an electrolyte membrane for a polymer electrolyte fuel cell (hereinafter sometimes referred to simply as an electrolyte membrane) of the present invention is characterized in that the electrolyte membrane is produced as an ionic polymer membrane by the method for producing an ionic polymer membrane of the present invention.

The electrolyte membrane preferably further contains at least one type of atoms selected from the group consisting of cerium and manganese.

The method for producing a catalyst layer for a polymer electrolyte fuel cell (hereinafter sometimes referred to simply as a catalyst layer) of the present invention is characterized in that the catalyst layer is produced as an ionic polymer membrane by the method for producing an ionic polymer membrane of the present invention.

The catalyst layer preferably contains a supported catalyst having platinum or a platinum alloy supported as a catalyst.

The method for producing a membrane/electrode assembly for a polymer electrolyte fuel cell of the present invention is a method for producing a membrane/electrode assembly which comprises an anode having a catalyst layer, a cathode having a catalyst layer, and an electrolyte membrane disposed between the anode and the cathode, and characterized in that either one or each of the electrolyte membrane and the catalyst layers, is formed as an ionic polymer membrane by the method for producing an ionic polymer membrane of the present invention.

The obtained membrane/electrode assembly for a polymer electrolyte fuel cell is to be used as a polymer electrolyte fuel cell.

Advantageous Effects of Invention

According to the method for producing an ionic polymer membrane (an electrolyte membrane, a catalyst layer and a membrane/electrode assembly) of the present invention, a —SO$_2$F group in a polymer can be converted to a pendant group having multiple ion exchange groups by a simple method while preventing a cross-linking reaction, and as a result, it is possible to obtain an ionic polymer membrane having a high ion exchange capacity and a low water uptake.

DESCRIPTION OF EMBODIMENTS

Figure 1:
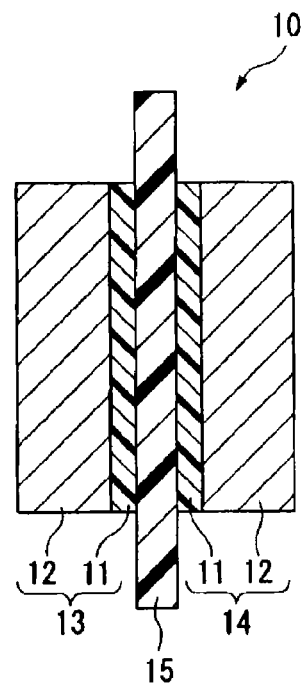
FIG. 1 is a cross-sectional view illustrating an example of a membrane/electrode assembly.

In this specification, a group represented by the formula (1) may be referred to as a group (1). The same applies to groups represented by other formulae.

In this specification, a compound represented by the formula (a) may be referred to as a compound (a). The same applies to compounds represented by other formulae.

The following definitions of terms apply to the entire specification including claims.

A monomer means a compound having a polymerization-reactive carbon-carbon double bond.

A polymer means a compound having a structure composed of multiple constituent units.

An ionic polymer means a polymer having ion exchange groups.

An ion exchange group means a group having a cation such as a hydrogen ion, a monovalent metal ion or an ammonium ion. An ion exchange group may, for example, be a sulfonic acid group ($-SO_3^-H^+$ group) or a sulfonimide group ($-SO_2N^-(H^+)-$ group).

A constituent unit means a unit derived from a monomer, as formed by polymerization of such a monomer. A constituent unit may be a unit formed directly by a polymerization reaction, or a unit formed by treatment of a polymer so that part of unit in the polymer is converted to another structure.

A main chain means a linear molecular chain whereby all molecular chains other than the main chain may be regarded as side chains.

A perfluorinated polymer means a polymer having all hydrogen atoms bonded to carbon atoms in the main and side chains, substituted by fluorine atoms.

A fluoropolymer means a polymer having some of hydrogen atoms bonded to carbon atoms in the main and side chains, substituted by fluorine atoms.

A perfluorinated monomer means a monomer having all hydrogen atoms bonded to carbon atoms, substituted by fluorine atoms.

A fluorinated monomer means a monomer having some of hydrogen atoms bonded to carbon atoms, substituted by fluorine atoms.

A perfluoroalkyl group means a group having all hydrogen atoms in an alkyl group substituted by fluorine atoms.

An organic group means a group having carbon atoms and hydrogen atoms bonded to the carbon atoms.

<Method for Producing Ionic Polymer Membrane>

With respect to the method for producing an ionic polymer membrane of the present invention, there are the following four embodiments depending upon the timing to form a polymer membrane.

First Embodiment

A method having the following steps (D), (A), (B), (C), (E) and (F) sequentially in this order.

(D) a step of forming a polymer membrane which contains a polymer (i) having a constituent unit having a group (1), prior to the step (A).

(A) a step of converting the group (1) in the polymer (i) to a group (2) to form a polymer (ii), (B) a step of reacting the polymer (ii) with a compound (a) to convert the group (2) in the polymer (ii) to a group (3) to form a polymer (iii).

(C) a step of converting the group (3) in the polymer (iii) to a group (4) to form a polymer (iv).

(E) a step of thermally treating the polymer membrane containing the polymer (iv).

(F) a step of converting the group (4) in the polymer (iv) to a group (5) to form a polymer (v), thereby to obtain an ionic polymer membrane which contains the polymer (v).

Second Embodiment

A method having the following steps (A), (D), (B), (C), (E) and (F) sequentially in this order.

(A) a step of converting a group (1) in a polymer (i) having a constituent unit having the group (1) to a group (2) to form a polymer (ii), (D) a step of forming a polymer membrane which contains the polymer (ii), between the step (A) and the step (B).

(B) a step of reacting the polymer (ii) with a compound (a) to convert the group (2) in the polymer (ii) to a group (3) to form a polymer (iii).

(C) a step of converting the group (3) in the polymer (iii) to a group (4) to form a polymer (iv).

(E) a step of thermally treating the polymer membrane containing the polymer (iv).

(F) a step of converting the group (4) in the polymer (iv) to a group (5) to form a polymer (v), thereby to obtain an ionic polymer membrane which contains the polymer (v).

Third Embodiment

A method having the following steps (A), (B), (D), (C), (E) and (F) sequentially in this order.

(A) a step of converting a group (1) in a polymer (i) having a constituent unit having the group (1) to a group (2) to form a polymer (ii), (B) a step of reacting the polymer (ii) with a compound (a) to convert the group (2) in the polymer (ii) to a group (3) to form a polymer (iii).

(D) a step of forming a polymer membrane which contains the polymer (iii), between the step (B) and the step (C).

(C) a step of converting the group (3) in the polymer (iii) to a group (4) to form a polymer (iv).

(E) a step of thermally treating the polymer membrane containing the polymer (iv).

(F) a step of converting the group (4) in the polymer (iv) to a group (5) to form a polymer (v), thereby to obtain an ionic polymer membrane which contains the polymer (v).

Fourth Embodiment

A method having the following steps (A), (B), (C), (D), (E) and (F) sequentially in this order.

(A) a step of converting a group (1) in a polymer (i) having a constituent unit having the group (1) to a group (2) to form a polymer (ii), (B) a step of reacting the polymer (ii) with a compound (a) to convert the group (2) in the polymer (ii) to a group (3) to form a polymer (iii).

(C) a step of converting the group (3) in the polymer (iii) to a group (4) to form a polymer (iv).

(D) a step of forming a polymer membrane which contains the polymer (iv), between the step (C) and the step (E).

(E) a step of thermally treating the polymer membrane containing the polymer (iv).

(F) a step of converting the group (4) in the polymer (iv) to a group (5) to form a polymer (v), thereby to obtain an ionic polymer membrane which contains the polymer (v).

$$—SO_2F \tag{1}$$

$$—SO_2NZ^1Z^2 \tag{2}$$

$$FSO_2(CF_2)_2SO_2F \tag{a}$$

$$—SO_2N^-(M_\alpha{}^+)SO_2(CF_2)_2SO_2F \tag{3}$$

$$—SO_2N^-(H^+)SO_2(CF_2)_2SO_2F \tag{4}$$

$$—SO_2N^-(M_\beta{}^+)SO_2(CF_2)_2SO_3{}^-M_\beta{}^+ \tag{5}$$

wherein each of $Z^1$ and $Z^2$ which are independent of each other, is a group selected from the group consisting of a hydrogen atom, a monovalent metal element and $Si(R)_3$, R is a hydrogen atom, or a $C_{1-12}$ monovalent organic group which may have an etheric oxygen atom, and three R may be the same or different groups one another, $M_\alpha{}^+$ is a monovalent metal cation, or a monovalent cation derived from an organic amine, and $M_\beta{}^+$ is a hydrogen ion, a monovalent metal cation, or a monovalent cation derived from an organic amine.

Among the four embodiments, the third embodiment wherein the step (B) is followed by the step (D), is particularly preferred in that the liquid obtained in the step (B) having the polymer (iii) swelled or dissolved in an aprotic polar solvent, can be used, as it is, for forming a membrane by a casting method.

Now, the third embodiment will be described in detail, but other embodiments may also be conducted in a manner similar to the third embodiment.

(Step (A))

This step is a step of converting the group (1) in the polymer (i) to a group (2) to form a polymer (ii) having the group (2).

As the monovalent metal element for $Z^1$ and $Z^2$, an alkali metal may, for example, be mentioned. From the viewpoint of availability and economical efficiency, sodium or potassium is preferred, and in a case where swelling properties or solubility in a solvent is required, lithium is preferred.

As —$Si(R)_3$ for $Z^1$ and $Z^2$, —$Si(CH_2)_3$ may, for example, be mentioned.

As the method for converting the group (1) to a group (2), depending upon the type of the group (2), the following methods (α) and (β) may be mentioned.

Method (α): a case where $Z^1$ and $Z^2$ in the group (2) are hydrogen atoms, i.e. the group (2) is a —$SO_2NH_2$ group.

Method (β): a case where at least one of $Z^1$ and $Z^2$ in the group (2) is a group selected from the group consisting of a monovalent metal element and $Si(R)_3$.

Now, each of the methods (α) and (β) will be described in detail.

Method (α):

Ammonia is contacted to the polymer (i) to convert the group (1) to a —$SO_2NH_2$ group. The method for contacting ammonia to the polymer (i) may, for example, be a method of contacting ammonia directly to the polymer (i); a method of bubbling by blowing ammonia into a polymer solution having the polymer (i) dissolved therein; or a method of contacting ammonia in such a state that the polymer (i) is swelled in a solvent. The temperature at the time of contacting ammonia is preferably from −80 to 50° C., more preferably from −30 to 30° C.

The amount of ammonia to be contacted, is preferably from 1.0 to 1,000, more preferably from 3.0 to 300, by molar ratio to the group (1) in the polymer (i). When the molar ratio is at least the lower limit value, a proper reaction rate is obtainable, the conversion of the group (1) to the group (2) can readily be made sufficiently high, and an ionic polymer membrane having a high ion exchange capacity will be readily obtainable. When the molar ratio is at most the upper limit value, such is advantageous from the viewpoint of costs or designing the apparatus, since it is not required to use an excessive amount of ammonia. An excessive amount of ammonia may be recovered and reused for the same reaction, and from the viewpoints of costs, it is preferred to reuse it.

Method (β):

The method (β) may, for example, be the following method (β1) and method (β2). However, the method (β) is by no means limited to the following methods.

Method (β1): a method of contacting $NHZ^{11}Z^{21}$ (each of $Z^{11}$ and $Z^{21}$ which are independent of each other is a group selected from the group consisting of a hydrogen atom, a monovalent metal element and $Si(R)_3$, and at least one of them is a monovalent metal element or $Si(R)_3$) to a polymer (i) having the group (1) to convert the group (1) to a —$SO_2NZ^{11}Z^{21}$ group.

Method (β1): a method of contacting ammonia to a polymer (i) having the group (1) to convert the group (1) to a —$SO_2NH_2$ group, then reacting e.g. an oxide, hydroxide, carbonate or hydroxide of a monovalent metal element and, as the case requires, further reacting $(R)_3SiNHSi(R)_3$, to convert it to a —$SO_2N Z^{11}Z^{21}$ group.

In the method (β1), the method of contacting $NHZ^{11}Z^{21}$ to the polymer (i) may, for example, be a method of contacting $NHZ^{11}Z^{21}$ directly to the polymer (i), a method contacting $NHZ^{11}Z^{21}$ to a polymer solution having the polymer (i) dissolved therein, or a method of contacting $NHZ^{11}Z^{21}$ in such a state that the polymer (i) is swelled in a solvent.

The amount of $NHZ^{11}Z^{21}$ to be contacted to the polymer (i) is preferably from 1.0 to 10, more preferably from 1.0 to 5, by molar ratio to the group (1) in the polymer (i).

In the method (β2), the method of contacting ammonia to the polymer (i) may, for example, be the same method as mentioned for the method (α).

In the step (A), it is preferred to convert the group (1) to a —$SO_2NH_2$ group from the viewpoint of the reactivity of the group (1). As such a method, a method of contacting ammonia is preferred from the viewpoint of the reactivity of the group (1).

In the polymer (i), it is preferred that an unstable group at the polymer terminal is preliminarily converted to a —$CF_3$ group as a stable group by fluorination. It is thereby possible to improve the durability of the obtainable ionic polymer membrane.

The polymer (i) is not particularly limited so long as it is a polymer having a —$SO_2F$ group. The polymer (i) may be a perfluorinated polymer or a fluoropolymer, and it may be a polymer wherein hydrogen atoms bonded to carbon atoms in the main chain and side chains may not be substituted by fluorine atoms. Or, it may be a polymer wherein among hydrogen atoms bonded to carbon atoms in the main chain and side chains, ones not substituted by fluorine atoms are substituted by substituents (such as chlorine atoms) other than fluorine atoms. As the polymer (i), a perfluorinated polymer is preferred from the viewpoint of the chemical stability in a case where the ionic polymer membrane is to be used in an application to e.g. a fuel cell where high durability is required against OH radicals.

The polymer (i) is preferably a polymer having a group (11) as a pendant group, in that a higher ion exchange capacity is thereby obtainable. When such a polymer is used, it is possible to obtain a polymer (ii) having a group (21) as a pendant group.

—(OCF$_2$CFR$^1$)$_a$OCF$_2$(CFR$^2$)$_b$SO$_2$F (11)

—(OCF$_2$CFR$^1$)$_a$OCF$_2$(CFR$^2$)$_b$SO$_2$NZ$^1$Z$^2$ (21)

Here, each of R$^1$ and R$^2$ which are independent of each other, is a fluorine atom, a chlorine atom or a C$_{1-10}$ perfluoroalkyl group which may have at least one etheric oxygen atom.

a is an integer of from 0 to 2.
b is an integer of from 0 to 6.
Z$^1$ and Z$^2$ are as defined above.
R$^1$ is preferably a fluorine atom or a CF$_3$ group.
R$^2$ is preferably a fluorine atom or a CF$_3$ group.
a is preferably an integer of from 0 to 2.
b is preferably an integer of from 1 to 5.

The following groups may be mentioned as specific examples of the group (11).

—O—(CF$_2$)$_2$SO$_2$F,
—OCF$_2$CF(CF$_3$)O(CF$_2$)$_2$SO$_2$F, etc.

The polymer (i) having a group (11) as a pendant group may be obtained by polymerizing a monomer having a group (11). As the monomer having a group (11), the following monomers may be mentioned.

CF$_2$=CF—O—(CF$_2$)$_2$SO$_2$F,
CF$_2$=CF—OCF$_2$CF(CF$_3$)O(CF$_2$)$_2$SO$_2$F, etc.

With a view to reducing the water uptake of the obtainable ionic polymer membrane, the monomer having a group (11) is preferably a monomer having a short pendant group, more preferably a monomer having a less number of etheric oxygen atoms in the pendant group, particularly preferably CF$_2$=CF—O—(CF$_2$)$_2$SO$_2$F.

As the polymer (i), a polymer having a group (12) as a pendant group is also preferred. A polymer wherein a —CF$_2$— group having a higher steric hindrance is bonded to the main chain, becomes a harder polymer (i) than a polymer wherein an etheric oxygen atom of a pendant group is bonded directly to the main chain.

—CF$_2$—O—(CF$_2$)$_2$SO$_2$F (12)

The polymer (i) having a group (12) as a pendant group may be obtained by polymerizing a monomer having a group (12). As the monomer having a group (12), CF$_2$=CF—CF$_2$—O—(CF$_2$)$_2$SO$_2$F is particularly preferred, since as disclosed in JP-A-58-96630, it can be synthesized in good yield by a short process, such being industrially less costly.

The polymer (i) may be a polymer obtained by polymerizing only the monomer having the group (11) or (12), or a polymer obtained by co-polymerizing the monomer having the group (11) or (12) with other monomer. A polymer obtained by co-polymerizing the monomer having the group (11) or (12) with other monomer, is preferred, since the mechanical strength of an ionic polymer membrane thereby obtainable will be higher, the water uptake can be more reduced, high dimensional stability is readily obtainable, and further, it is possible to readily prevent the ion exchange capacity from becoming too high.

Such other monomer may be a perfluorinated monomer or a fluorinated monomer, or a monomer wherein hydrogen atoms bonded to carbon atoms are not substituted by fluorine atoms. As such other monomer, a perfluorinated monomer is preferred from the viewpoint of the durability and chemical stability.

Such other monomer may, for example, be TFE, hexafluoropropylene (HFP), vinylidene fluoride, chlorotrifluoroethylene, trifluoroethylene, a vinyl ether (such as CF$_2$=CF—O—C$_3$F$_7$, CF$_2$=CF—O—CF$_2$—CF(CF$_3$)—O—C$_3$F$_7$, methyl vinyl ether or ethyl vinyl ether), ethylene, propylene, 1-butene, isobutylene, a cyclic monomer (such as perfluoro(2,2-dimethyl-1,3-dioxole), perfluoro(1,3-dioxole), perfluoro(2-methyl-1,3-dioxole), perfluoro(2-ethyl-1,3-dioxole), perfluoro(2,2-diethyl-1,3-dioxole), perfluoro(2-methylene-4-methyl-1,3-dioxolane), perfluoro(2-methylene-4-ethyl-1,3-dioxolane), perfluoro(2-methylene-4-butyl-1,3-dioxolane) or 2,2,4-trifluoro-5-trifluoromethoxy-1,3-dioxole), a cyclopolymerizable monomer (such as perfluoro(3-butenyl vinyl ether), perfluoro[(1-methyl-3-butenyl) vinyl ether], perfluoro(allyl vinyl ether) or 1,1'-[(difluoromethylene)bis(oxy)]bis[1,2,2-trifluoroethene]), etc. As such other monomer, from the viewpoint of the durability, etc. of an ionic polymer membrane obtainable, a perfluorinated monomer is preferred, and from the viewpoint of the copolymerizability, TFE is particularly preferred.

In the polymer (i), the proportion of the constituent unit having the group (11) or (12) is preferably from 2 to 50 mol %, more preferably from 5 to 30 mol %, particularly preferably from 10 to 25 mol %, to all constituent units. When the proportion is at least the lower limit value, an ionic polymer membrane having a high ion exchange capacity is readily obtainable. When the proportion is at most the upper limit value, the mechanical strength of the ionic polymer membrane will be higher, the water uptake will be lower, and high dimensional stability will be readily obtainable.

The content of the group (1) in the polymer (i) is preferably from 0.5 to 5 mmol/g, more preferably from 0.8 to 3 mmol/g, particularly preferably from 1.0 to 2.0 mmol/g. When the content of the group (1) is at least the lower limit value, an ionic polymer membrane having a high ion exchange capacity will be readily obtainable. When the content of the group (1) is at most the upper limit value, the water uptake can readily be lowered, and high dimensional stability will be readily obtainable.

As the polymerization method for the polymer (i), a conventional polymerization method may be employed.

(Step (B))

This step is a step of reacting the polymer (ii) with a compound (a) to convert the group (2) to the group (3) to prepare a polymer (iii).

In a case where the polymer (ii) has the group (21) as a pendant group, a polymer (iii) having a group (31) as a pendant group is obtainable.

—(OCF$_2$CFR$^1$)$_a$OCF$^2$(CFR$^2$)$_b$SO$^2$N$^-$(M$_\alpha^+$)SO$_2$(CF$_2$)$_2$SO$_2$F (31)

wherein R$^1$, R$^2$, a, b and M$_\alpha^+$ are as defined above.

In a case where M$_\alpha^+$ in the group (3) is a monovalent metal cation, the metal cation may, for example, be a sodium ion or a potassium ion. In a case where M$_\alpha^+$ in the group (3) is a monovalent cation derived from an organic amine, the organic amine may, for example, be a tertiary amine compound (such as trimethylamine, triethylamine, tripropylamine, tributylamine, N,N,N',N'-tetramethylethylene diamine or 1,4-diazabicyclo[2.2.2]octane).

The compound (a) may be synthesized by known methods. As such methods, the following methods (γ1) and (γ2) may be mentioned.

Method (γ1): a method wherein $ICF_2CF_2I$ being an adduct of TFE and iodine, is used as a starting material, and converted to $NaSO_2CF_2CF_2SO_2Na$ by a known method, followed by conversion to $ClSO_2CF_2CF_2SO_2Cl$ and finally by conversion to $FSO_2CF_2CF_2SO_2F$.

Method (γ2): a method wherein TFE and sulfuric anhydride are reacted to obtain tetrafluoroethanesultone, which is ring-opened and then hydrolyzed to obtain $FSO_2CF_2COOH$, which is further subjected to coupling by Kolbe electrolysis (WO2006/106960).

As a synthetic method for the compound (a), the method (γ1) or (γ2) is preferred in that a perfluorinated compound is used, whereby as is different from a method for synthesis by e.g. electrolytic fluorination, impurities containing C—H bonds which are poor in durability as compared with C—F bonds, are not likely to be included, and the method (γ2) is more preferred in that the number of process steps is small, and the synthesis can be conducted industrially less costly.

The purity of the compound (a) is preferably at least 98%, more preferably at least 99%, further preferably at least 99.5%, as measured by gas chromatography. Further, in the measurement by $^1H$-NMR of the compound (a), it is preferred that no peak of a C—H bond other than a C—H bond derived from a solvent contained in the polymerization solvent is detected.

When synthesized by the method (γ2), the compound (a) is obtainable in high purity.

However, when $FSO_2(CF_2)_3SO_2F$ or the compound (a) is synthesized by a method of electrolytically fluorinating its precursor such as $FSO_2(CH_2)_3SO_2F$ or $FSO_2(CH_2)_2SO_2F$, impurities having C—H bonds remained without being completely fluorinated, may be contained (see Journal of Fluorine Chemistry, Vol. 35, 1987, p. 329). If a material containing such impurities is used as an electrolyte material for a fuel cell, adequate durability may not be obtainable. Purification to remove such impurities is difficult, and it is difficult to obtain a pure perfluorinated compound by purification.

The amount of the compound (a) to be used, is preferably from 0.5 to 20, more preferably from 1 to 10, particularly preferably from 1.1 to 5, by molar ratio to the group (2) in the polymer (ii). When the molar ratio is at least the lower limit value, a proper reaction rate is obtainable, the conversion of the group (2) to the group (3) can readily be made sufficiently high, and it is possible to readily obtain an ionic polymer having a high ion exchange capacity. When the molar ratio is at most the upper limit value, such is advantageous from the viewpoint of costs, since it is unnecessary to use an excessive amount of the compound (a).

In the step (B), it is preferred to let the polymer (ii) be swelled or dissolved in an aprotic polar solvent and then be reacted with the compound (a).

The aprotic polar solvent is a solvent which does not easily give a proton. As such aprotic polar solvents, N,N-dimethylacetamide (DMAc), N,N-dimethylformamide (DMF), 1,3-dimethyl-2-imidazolidinone (DMI), N-methyl-2-pyrrolidone (NMP), dimethyl sulfoxide, sulfolane, γ-butyrolactone, acetonitrile, tetrahydrofuran, 1,4-dioxane, $CH_3O(CH_2CH_2O)_cCH_3$ (wherein c is an integer of from 1 to 4), etc. may be mentioned. From the viewpoint of affinity to the polymer, etc., DMAc, DMF, DMI, NMP or acetonitrile is preferred, and DMF, DMAc or acetonitrile is more preferred.

In the step (B), the mass ratio of the aprotic polar solvent to the polymer (ii) is preferably from 1:99 to 99:1, more preferably from 1:50 to 50:1, further preferably from 1:5 to 20:1, particularly preferably from 1:2 to 10:1. When the molar ratio of the aprotic polar solvent to the polymer (ii) is at least the lower limit value, the reaction proceeds efficiently without using the solvent more than necessary. When the molar ratio of the aprotic polar solvent to the polymer (ii) is at most the upper limit value, it becomes easy to let the reaction proceed uniformly while preventing a side reaction such as a cross-linking reaction, and a proper reaction rate is readily obtainable.

In the case of reacting the polymer (ii) with the compound (a) in the step (B), it is also preferred to use a reaction accelerator. As such a reaction accelerator, a tertiary amine compound is preferred.

As such a tertiary amine compound, N,N'-tetramethylethylenediamine (TMEDA), trimethylamine, triethylamine, tripropylamine, tributylamine or 1,4-diazabicyclo[2.2.2]octane may, for example, be mentioned.

The amount of the reaction accelerator to be used, is preferably from 1 to 20, more preferably from 2 to 5, by molar ratio to the group (2). When the amount of the reaction accelerator to be used, is at least the lower limit value, an ionic polymer membrane having a high ion exchange capacity will be readily obtainable. When the amount of the reaction accelerator to be used, is at most the upper limit value, it will be possible to efficiently remove an excessive reagent for purification.

In the step (B), with a view to preventing a side reaction such as hydrolysis of the compound (a), as the aprotic polar solvent and the reaction accelerator, it is preferred to use ones subjected to dehydration treatment. As such dehydration treatment, a method of employing molecular sieves may, for example, be mentioned.

In the step (B), with a view to preventing hydrolysis of the compound (a), it is preferred not to let moisture be included, and it is preferred to react the polymer (ii) with the compound (a) in a nitrogen atmosphere.

The reaction temperature for the reaction of the polymer (ii) with the compound (a) in the step (B) is preferably from 0 to 150° C., more preferably from 20 to 80° C. When the reaction temperature is at least the lower limit value, the reaction efficiency may be improved. When the reaction temperature is at most the upper limit value, it is possible to readily prevent an undesirable side reaction such as a cross-linking reaction or a decomposition reaction.

By selecting the group (2) in the polymer (ii) to be —$SO_2NHM^+$ (wherein $M^+$ is a monovalent metal such as $Li^+$, $Na^+$, $K^+$ or $Cs^+$), a polymer (iii) wherein $M_\alpha^+$ in the group (3) is a monovalent metal cation, is obtainable. Further, by selecting the group (2) to be —$SO_2NH_2$ and using a tertiary amine compound as a reaction accelerator, a polymer (iii) wherein $M_\alpha^+$ in the group (3) is a monovalent cation derived from the organic amine compound, is obtainable.

(Step (D))

In the third embodiment, in the step (D), a polymer membrane containing the polymer (iii) is formed between the step (B) and the step (C).

Further, in other than the third embodiment, a polymer membrane containing the polymer (i) may be formed prior to the step (A) (the first embodiment), a polymer membrane containing the polymer (ii) may be formed between the step (A) and the step (B) (the second embodiment), or a polymer membrane containing the polymer (iv) may be formed between the step (C) and the after-described step (E) (the fourth embodiment).

In the third embodiment, as the method for forming a polymer membrane, for example, the following methods (δ1) and (δ2) may be mentioned.

Method (δ1): a method of applying a liquid containing the polymer (iii) on the surface of an object to be coated, followed by drying to form a polymer membrane containing the polymer (iii) (casting method).

Method (δ2): a method of thermoforming a material containing the polymer (iii) to form a polymer membrane containing the polymer (iii) (thermoforming method).

As the method for forming a polymer membrane, the method (δ1) is preferred in that a liquid having the polymer (iii) swelled or dissolved in an aprotic polar solvent, obtained in the step (B), may be used, as it is, for the preparation of the membrane, and it is possible to form a thin polymer membrane (one having a thickness of a few to a few tens μm in the case of an electrolyte membrane).

By using, as the liquid containing the polymer (iii) or the material containing the polymer (iii), one having a solid content composed mainly of the polymer (iii), it is possible to obtain a precursor for e.g. an ion exchange membrane or an electrolyte membrane.

By using, as the liquid containing the polymer (iii) or the material containing the polymer (iii), one having a solid content composed mainly of the polymer (iii) and a catalyst, it is possible to obtain a precursor for e.g. a catalyst layer.

In the step (D), a precursor for an electrolyte membrane and a precursor for a catalyst layer may be formed, or a precursor for a membrane/electrode assembly may be formed by bonding a precursor for an electrolyte membrane and a precursor for a catalyst layer, which are separately formed.

Further, in the first embodiment, instead of the liquid containing the polymer (iii), a liquid containing the polymer (i) may be used; in the second embodiment, instead of the liquid containing the polymer (iii), a liquid containing the polymer (ii) may be used; and in the fourth embodiment, instead of the liquid containing the polymer (iii), a liquid containing the polymer (iv) may be used.

Method (δ1):

As the coating method, a known method may be mentioned.

The drying temperature is preferably from 40 to 130° C., more preferably from 60 to 100° C.

As the object to be coated, in a case where the polymer membrane is a precursor for an electrolyte membrane, a carrier film or a precursor for a catalyst layer may, for example, be mentioned, and in a case where the polymer membrane is a precursor for a catalyst layer, a carrier film, a precursor for an electrolyte membrane or a gas diffusion layer may, for example, be mentioned.

As the carrier film, a fluorinated resin film or an olefin-type resin film may, for example, be mentioned.

Method (δ2):

As the thermoforming method, a known method such as a melt extrusion method or a hot pressing method may, for example, be mentioned.

The temperature at the time of thermoforming is preferably higher than the softening temperature of the polymer and not higher than the decomposition temperature of the polymer.

In a case where a material containing the polymer (iv) is thermoformed in the step (D), the step (D) may serve as both a step of forming a polymer membrane and a step (after-described step (E)) of thermally treating the polymer membrane.

(Step (C))

This step is a step of converting the group (3) in the polymer (iii) to a group (4) to form a polymer (iv).

In a case where the polymer (iii) has the group (31) as a pendant group, a polymer (iv) having a group (41) as a pendant group is obtainable.

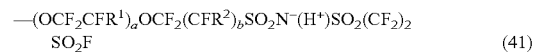

$$—(OCF_2CFR^1)_aOCF_2(CFR^2)_bSO_2N^-(H^+)SO_2(CF_2)_2SO_2F \quad (41)$$

wherein $R^1$, $R^2$, a and b are as defined above.

As the method for converting the group (3) to the group (4), the following method (ε) may be mentioned.

Method (ε): a method of treating the polymer (iii) with an aqueous solution of an acid such as hydrochloric acid, nitric acid or sulfuric acid (acid treatment).

The temperature for the acid treatment is preferably from 10 to 100° C., more preferably from 50 to 95° C.

(Step (E))

This step is a step of thermally treating a polymer membrane containing the polymer (iv) after the step (C) and between the step (D) and the step (F).

By the thermal treatment, the water uptake of the ionic polymer membrane can be made sufficiently low.

The method for the thermal treatment may, for example, be a method of heating the polymer membrane containing the polymer (iv) in e.g. an oven; or a method of subjecting the polymer membrane containing the polymer (iv) to hot pressing.

The step (E) may include both a step of bonding a precursor for an electrolyte membrane and a precursor for a catalyst layer by hot pressing to obtain a precursor for a membrane/electrode assembly, and a step of thermally treating the polymer membrane.

The temperature for the thermal treatment is preferably at most 160° C., more preferably higher than the softening point of the polymer (iv) and at most 160° C., particularly preferably at least the softening point of the polymer (iv)+20° C. and at most 160° C. When the temperature for the thermal treatment is at most 160° C., it is not required to use a special apparatus durable against a high temperature of the thermal treatment, and at the same time, it is possible to reduce the energy required for the thermal treatment, such being advantageous from the viewpoint of costs. Further, in a case where the polymer membrane is a precursor for a catalyst layer, decomposition of the catalyst can be prevented. When the temperature for the thermal treatment is at least the softening temperature of the polymer (iv)+20° C., the effects of the thermal treatment are sufficiently obtainable.

(Step (F))

This step is a step of converting the group (4) in the polymer (iv) to a group (5) to form a polymer (v) thereby to obtain an ionic polymer membrane containing the polymer (v).

In a case where the polymer (iv) has the group (41) as a pendant group, a polymer (v) having a group (51) as a pendant group is obtainable.

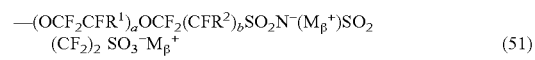

$$—(OCF_2CFR^1)_aOCF_2(CFR^2)_bSO_2N^-(M_\beta^+)SO_2(CF_2)_2SO_3^-M_\beta^+ \quad (51)$$

wherein $R^1$, $R^2$, a, b and $M_\beta^+$ are as defined above.

As the group (51), for example, the following groups may be mentioned.

—O(CF$_2$)$_2$SO$_2$N$^-$(M$_\beta^+$)SO$_2$(CF$_2$)$_2$SO$_3^-$M$_\beta^+$,
—OCF$_2$CF(CF$_3$)O(CF$_2$)$_2$SO$_2$N$^-$(M$_\beta^+$)SO$_2$(CF$_2$)$_2$SO$_3^-$M$_\beta^+$, etc.

As the method for converting the group (4) to the group (5), the following method (ζ) may be mentioned.

Method (ζ): a method of treating the polymer (iv) with a basic solution (hydrolysis treatment). As the case requires, acid treatment may further be carried out.

The basic solution may, for example, be a solution of sodium hydroxide, potassium hydroxide or the like using, as a solvent, water, a mixed liquid of water and an alcohol (such as methanol or ethanol), or a mixed liquid of water and a polar solvent (such as dimethylsulfoxide).

The acid treatment may be conducted in the same manner as the above-mentioned method (ε).

The temperature for the hydrolysis treatment and the acid treatment is preferably from 10 to 100° C., more preferably from 50 to 95° C.

In the ionic polymer membrane obtainable by the production method of the present invention, preferably at least 50 mol % of the group (1) in the polymer (i) is converted to the group (5), more preferably at least 80 mol % of the group (1) is converted to the group (5), and particularly preferably 100 mol % of the group (1) is converted to the group (5), since a high ion exchange capacity is thereby readily obtainable.

Advantageous Effects

In the method for producing an ionic polymer membrane of the present invention as described above, the compound (a) is used in the step (B), whereby a —SO$_2$F group in a polymer can be converted to a pendant group having multiple ion exchange groups by a simple method, while preventing a cross-linking reaction, and as a result, it is possible to obtain an ionic polymer membrane having a high ion exchange capacity and a low water uptake.

The reason as to why such effects are obtainable is as follows.

As is different from FSO$_2$(CF$_2$)$_3$SO$_2$F or FSO$_2$(CF$_2$)$_4$SO$_2$F, the compound (a) has such a characteristic that when one —SO$_2$F group reacts, the reactivity of the other —SO$_2$F group decreases whereby a cross-linking reaction tends to hardly proceed. Therefore, even if the compound (a) is not used in a large excess amount, it is possible to prevent a cross-linking reaction from taking place, and it is possible to produce the polymer (iv) having the group (5) by a simple method. Further, the group (5) formed by the compound (a) has a lower water uptake than a pendant group formed by FSO$_2$(CF$_2$)$_3$SO$_2$F or FSO$_2$(CF$_2$)$_4$SO$_2$F.

Further, as cross-linking in the polymer is prevented, it is possible to easily form a thin polymer membrane by a casting method.

Further, the compound (a) can be produced at a relatively low cost in an industrial scale by a small number of process steps, and thus, it is expected that an ionic polymer membrane advantageous from the viewpoint of costs is obtainable.

Further, the compound (a) is readily obtainable as one having a high purity, since during its synthesis, there is little impurity wherein a C—F bond in the compound (a) is replaced by a C—H bond. Thus, it is expected that an ionic polymer membrane having excellent durability is obtainable.

Further, prior to the step (A), unstable terminals of the polymer (i) may preliminarily be converted to stable terminals of perfluorinated terminals by means of e.g. fluorine gas, whereby it is expected that an ionic polymer membrane having further excellent durability is obtainable.

Further, in the method for producing an ionic polymer membrane of the present invention, a polymer membrane containing the polymer (iv) is thermally treated after the step (C) and between the step (D) and the step (F), whereby it is possible to sufficiently lower the water uptake of the ionic polymer membrane, while preventing a decrease in the ion exchange capacity of the ionic polymer membrane.

The reason for carrying out the step (E) (thermal treatment) after the step (D) (membrane formation) is as follows.

The effect to lower the water uptake of the ionic polymer membrane by the thermal treatment is obtainable by thermal treatment in a state of a membrane and by maintaining the state of a membrane after the thermal treatment. Therefore, if a membrane is formed after thermal treatment, such an effect of the thermal treatment is not obtainable.

The reason for carrying out the step (E) (thermal treatment) between the step (C) (conversion of the group (3) to the group (4)) and the step (F) (conversion of the group (4) to the group (5)) is as follows.

As mentioned above, the thermal treatment is preferably carried out at a temperature higher than the softening temperature of the polymer, specifically at a temperature of at least the softening temperature of the polymer+20° C. However, the polymer (iii) having the group (3) and the polymer (v) having the group (5) have high softening temperatures, and therefore, thermal treatment is required to be conducted at a high temperature (higher than 160° C.). Accordingly, it is required to use a special apparatus durable against such a high temperature for thermal treatment, and the energy required for the thermal treatment increases, such being disadvantageous from the viewpoint of costs.

Further, in a case where the polymer membrane is a precursor for a catalyst layer, the catalyst is likely to be decomposed.

Further, it is required to carry out separately the step of thermal treatment and the step of bonding a precursor for an electrolyte membrane and a precursor for a catalyst layer by hot pressing to obtain a membrane/electrode assembly, whereby the production steps tend to be cumbersome, and the costs also tend to increase.

Further, in a case where the group (5) is an acid-form (i.e. —SO$_2$N$^-$(H$^+$)SO$_2$(CF$_2$)$_2$SO$_3^-$H$^+$ group), decomposition of the acid-form group (5) occurs at a temperature of at least 100° C. (especially at least 140° C.), and it changes to a sulfonamide group, whereby the ion exchange capacity of the ionic polymer membrane decreases. The decomposition of the acid-form group (5) is considered to proceed as follows.

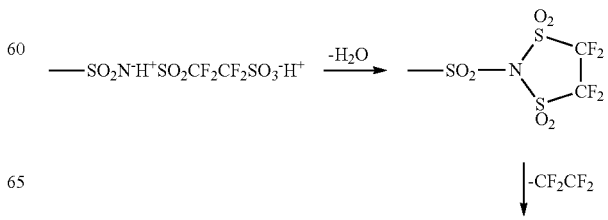

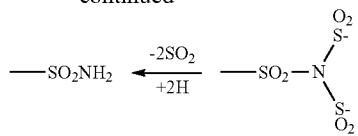

On the other hand, the polymer (iv) having the group (4) has a low softening temperature and can be thermally treated at a low temperature of at most 160° C. Therefore, it is not required to use a special apparatus durable at a high temperature of thermal treatment, and the energy required for thermal treatment is saved, such being advantageous from the viewpoint of costs.

Further, in a case where the polymer membrane is a precursor for a catalyst layer, decomposition of the catalyst can be prevented. Further, it is possible to simultaneously carry out a step of thermal treatment and a step of bonding a precursor for an electrolyte membrane and a precursor for a catalyst layer by hot pressing to obtain a precursor for a membrane/electrode assembly.

Further, the group (4) is scarcely decomposable at a temperature of at most 160° C., and therefore, it is possible to prevent a decrease in the ion exchange capacity of the ionic polymer membrane.

<Method for Producing Electrolyte Membrane>

The method for producing an electrolyte membrane of the present invention is a method of producing an electrolyte membrane as one type of an ionic polymer membrane by the method for producing an ionic polymer membrane of the present invention.

The electrolyte membrane may be produced in the same manner as the above-described ionic polymer membrane, and therefore, the detailed description of the method for producing the electrolyte membrane will be omitted.

The electrolyte membrane or its precursor may be treated with an aqueous hydrogen peroxide solution in order to decompose impurities thereby to improve the durability. It is preferred to carry out such treatment with an aqueous hydrogen peroxide solution between the hydrolysis treatment and the acid treatment in the step (F).

The electrolyte membrane may be reinforced by a reinforcing material. The reinforcing material may, for example, be a porous body, fibers, woven fabrics, non-woven fabrics, etc. The material for the reinforcing material may, for example, be polytetrafluoroethylene (hereinafter referred to as PTFE), a tetrafluoroethylene/hexafluoropropylene copolymer, a tetrafluoroethylene/perfluoro(alkyl vinyl ether) copolymer (hereinafter referred to as PFA), polyethylene, polypropylene, polyphenylene sulfide, etc. It is preferred to carry out such reinforcement with a reinforcing material in the step (D).

The electrolyte membrane may further contain at least one type of atoms selected from the group consisting of cerium and manganese. Cerium and manganese decompose hydrogen peroxide which is a substance to cause deterioration of the electrolyte membrane. Such cerium and manganese are preferably present as ions in the electrolyte membrane, and so long as they are ones present as ions, they may be present in any state in the electrolyte membrane.

The method to let ions of cerium, manganese, etc. be contained in the electrolyte membrane may, for example, be (1) a method of adding a metal salt such as a cerium salt, a manganese salt, etc. to a liquid containing the ionic polymer to prepare a liquid composition containing the ionic polymer and metal ions such as cerium ions, manganese ions, etc., and then, forming the liquid composition into a membrane by e.g. a casting method to obtain an electrolyte membrane, (2) a method of immersing an electrolyte membrane in a solution containing metal ions such as cerium ions, manganese ions, etc., or (3) a method of contacting an electrolyte membrane with an organic metal complex salt of cerium, manganese, etc.

The electrolyte membrane may contain silica, a heteropolyacid (such as zirconium phosphate, phosphomolybdic acid or phosphotungustic acid), etc. as a water retention agent to prevent drying.

<Method for Producing Catalyst Layer>

The method for producing a catalyst layer of the present invention is a method of producing a catalyst layer as one type of an ionic polymer membrane by the method for producing an ionic polymer membrane of the present invention.

The catalyst layer may be produced in the same manner as the above-described ionic polymer membrane, and therefore, the detailed description of the method for producing the catalyst layer will be omitted.

The catalyst layer is a membrane containing a catalyst and the polymer (v).

The catalyst may be any catalyst so long as it is one capable of promoting a redox reaction in a fuel cell, and it is preferably a catalyst containing platinum, particularly preferably a supported catalyst having platinum or a platinum alloy supported on a carbon carrier.

The carbon carrier may, for example, be activated carbon, carbon black, etc.

The platinum alloy is preferably an alloy of platinum with at least one type of metal selected from the group consisting of platinum group metals excluding platinum (ruthenium, rhodium, palladium, osmium and iridium), gold, silver, iron, titanium, manganese, cobalt, nickel, molybdenum, tungsten, aluminum, silicon, zinc and tin.

The supported amount of platinum or a platinum alloy is preferably from 10 to 70 mass %, more preferably from 10 to 50 mass %, in the supported catalyst (100 mass %).

The amount of platinum contained in the catalyst layer is preferably from 0.01 to 3.0 mg/cm$^2$ from the viewpoint of the optimum thickness to conduct the electrode reaction efficiently, more preferably from 0.05 to 0.5 mg/cm$^2$ from the viewpoint of the balance of the material costs and the performance.

The catalyst layer may contain a water repellent agent with a view to increasing an effect to prevent flooding. The water repellent agent may, for example, be a tetrafluoroethylene/hexafluoropropylene copolymer, PFA, PTFE, etc.

The water repellent agent is preferably a fluorinated polymer which can be dissolved in a solvent, since the catalyst layer can be thereby readily treated for water repellency. The amount of the water repellent agent is preferably from 0.01 to 30 mass %, more preferably from 0.01 to 10 mass %, in the catalyst layer (100 mass %).

<Method for Producing Membrane/Electrode Assembly>

The method for producing a membrane/electrode assembly of the present invention is a method of forming either one or each of the electrolyte membrane and the catalyst layers as one type of an ionic polymer membrane by the method for producing an ionic polymer membrane of the present invention.

In the step (D), a precursor for an electrolyte membrane and a precursor for a catalyst layer may be bonded to form a precursor for a membrane/electrode assembly; in the step (E), a precursor for an electrolyte membrane and a precursor for a catalyst layer may be bonded at the same time as being thermally treated by hot pressing; or after the step (F), the electrolyte membrane and the catalyst layer may be bonded to form a membrane/electrode assembly.

With a view to simplifying the production process and reducing the costs, it is preferred to have a precursor for an electrolyte membrane and a precursor for a catalyst layer bonded at the same time as thermally treated by hot pressing in the step (E).

At the time of bonding an electrolyte membrane (or its precursor) and a catalyst layer (or its precursor), at least one of the electrolyte membrane (or its precursor) and the catalyst layer (or its precursor) may be one formed by the method for producing an ionic polymer membrane of the present invention.

FIG. 1 is a cross-sectional view illustrating an example of a membrane/electrode assembly. A membrane/electrode assembly 10 comprises an anode 13 having a catalyst layer 11 and a gas diffusion layer 12, a cathode 14 having a catalyst layer 11 and a gas diffusion layer 12, and an electrolyte membrane 15 disposed between the anode 13 and the cathode 14 in such a state as in contact with the catalyst layers 11.

The gas diffusion layer 12 has a function to uniformly disperse gas to the catalyst layer 11 and a function as a current collector.

The gas diffusion layer 12 may, for example, be carbon paper, carbon cloth or carbon felt.

The gas diffusion layer 12 is preferably treated for water repellency with e.g. PTFE.

Figure 2:
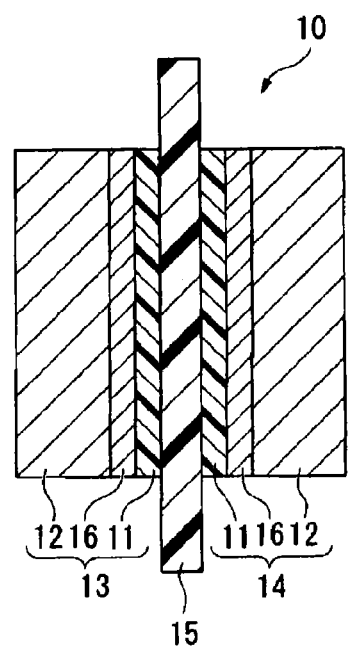
FIG. 2 is a cross-sectional view illustrating another example of a membrane/electrode assembly.

As shown in FIG. 2, the membrane/electrode assembly 10 may have an interlayer 16 between the catalyst layer 11 and the gas diffusion layer 12. By disposing the interlayer 16, the gas diffusion properties at the surface of the catalyst layer 11 will be improved, and the power generation performance of the polymer electrolyte fuel cell will be substantially improved.

The interlayer 16 is a layer containing carbon (such as carbon powder or carbon nanofibers) and a non-ionic fluorinated polymer. As the non-ionic fluorinated polymer, PTFE or the like may be mentioned.

<Polymer Electrolyte Fuel Cell>

The membrane/electrode assembly is used for a polymer electrolyte fuel cell. A polymer electrolyte fuel cell is produced, for example, by sandwiching a membrane/electrode assembly between two sheets of separator to form a cell, and stacking a plurality of such cells.

As the separator, an electrically conductive carbon plate having grooves formed to constitute flow paths for a fuel gas or an oxidant gas containing oxygen (such as air or oxygen) may, for example, be mentioned.

As a type of the polymer electrolyte fuel cell, a hydrogen/oxygen type fuel cell or direct methanol type fuel cell (DMFC) may, for example, be mentioned. Methanol or a methanol aqueous solution to be used as a fuel for DMFC may be a liquid feed or a gas feed.

EXAMPLES

Now, the present invention will be described in detail with reference to Examples, however, it should be understood that the present invention is by no means restricted by the following description.

Ex. 1 is an Example of the present invention, and Ex. 2 to 10 are Comparative Examples.

(Softening Temperature)

The softening temperature (tan δ) of a polymer membrane was obtained by the following method.

Using a dynamic viscoelastic analyzer (DVA-225, manufactured by IT Keisoku Seigyo K.K.), dynamic viscoelastic measurements were carried out under such conditions as a sample width of 5.0 mm, a clamping distance of 15 mm, a measuring frequency of 1 Hz and a temperature-raising rate of 2° C./min., and the peak temperature of tan δ was obtained from a graph of tan δ (loss tangent). The peak temperature of tan δ was taken as the softening temperature in Examples.

(Conductivity)

The conductivity (ion conductivity) of an ionic polymer membrane was obtained by the following method.

To an ionic polymer membrane having a width of 5 mm, a substrate having four terminal electrodes disposed at intervals of 5 mm was appressed, and the resistance of the ionic polymer membrane was measured at an alternate current of 10 kHz at a voltage of 1V under constant temperature and humidity conditions at a temperature of 80° C. under a relative humidity of from 20 to 95% by known four-terminal sensing. From the results of the measurement, the conductivity was calculated.

The conductivity of an ionic polymer membrane becomes an index for the ion exchange capacity.

(Water Uptake)

The water uptake of an ionic polymer membrane was obtained by the following method.

An ionic polymer membrane was immersed in warm water of 80° C. for 16 hours and then cooled until the warm water became 25° C. or lower, whereupon the ionic polymer membrane was taken out, and water attached to the surface of the ionic polymer membrane was wiped off with filter paper, whereupon the mass of the ionic polymer membrane was measured (mass W1). Then, the ionic polymer membrane was dried for at least 48 hours in a glove box in a nitrogen atmosphere, whereupon the mass was measured in the glove box as it was (mass W2). A value obtained by (W1−2)/W2×100 was taken as the water uptake (%).

(Mass-Decreasing Behavior)

The mass-decreasing behavior of an ionic polymer membrane was obtained by the following method.

Using a differential thermal-thermogravimetric simultaneous analyzer (TG-DTA2000, manufactured by Bruker AXS), the thermal mass change was measured under the following conditions, and the mass-decreasing behavior of an ionic polymer membrane against the temperature was investigated.

Sample pan: made of aluminum

Air flow rate: 100 mL/min.

Temperature-raising pattern: "room temperature→(temperature-raising at 10° C./min.)→constant temperature at 100° C. for 60 minutes→(temperature-raising at 2° C./min.)→constant temperature at 320° C. for 10 minutes→end of the measurement"

Here, in order to minimize an influence of moisture contained in each sample, the mass of the sample after being held at a constant temperature of 100° C. for 60 minutes was used as a standard, and the mass decrease from this standard mass was taken as the mass change ratio (mass %).

Ex. 1

A polymer containing 1.0 mmol/g of a —SO$_2$F group, obtained by polymerizing TFE with compound (m1), was contacted with fluorine gas and fluorinated to obtain a stabilized polymer (i).

$CF_2=CF—OCF_2CF(CF_3)O(CF_2)_2SO_2F$     (m1)

(Step (A))

20 g of the above polymer (i) was put, together with 2,000 g of $CF_3(CF_2)_5H$, into a 2 L (liters) pressure resistant container equipped with a thermometer and a stirrer, and heated to 125° C. with stirring to prepare a solution. After cooling the solution, the pressure resistant container was opened to confirm the dissolution of the polymer (i). The solution was a whitish transparent liquid. The pressure resistant container was closed again, and the gas phase portion was replaced with nitrogen, and then, the pressure resistant container was dipped in a dry ice/ethanol bath and cooled with stirring at a rate of 200 rpm. After the internal temperature decreased to −21° C., ammonia gas was introduced from the gas phase portion. Introduction of ammonia gas was conducted by adjusting the rate so that the internal temperature would not be higher than −10° C., and during the period, the internal temperature was controlled to be from −21 to −11° C. When the system became stabilized at an internal temperature of −11° C. under an internal pressure of 0.3 MPa, the introduction of ammonia gas was terminated. The time required for the introduction of ammonia gas was 3 hours. Cooling with dry ice was terminated, and the temperature of the pressure resistant container was slowly raised to room temperature while disposed in an ethanol bath. The time required for raising the internal temperature to 20° C. and the internal pressure to 0.81 MPa by this operation was 7 hours. Then, while maintaining the internal temperature at from 10 to 20° C., the reaction was further continued for 12 hours. Then, ammonia gas was purged, and the internal pressure of the container was returned to ordinary pressure. The time required for the purging was 4 hours. After completion of the purging, the pressure resistant container was opened to confirm that a white to slightly yellow polymer was precipitated in the solution. The precipitated polymer was separated from the solvent by suction filtration, and the polymer was washed with 230 mL of $CF_3(CF_2)_5H$. The polymer was washed 6 times with a 3N hydrochloric acid aqueous solution and further washed 5 times with pure water, followed by drying to obtain 18.5 g of a white solid.

The obtained white solid was analyzed by an infrared spectroscopic analysis, whereby it was confirmed that a peak attributable to a $SO_2F$ group of the polymer (i) in the vicinity of 1468 $cm^{-1}$ completely disappeared, and instead, a peak attributable to a $SO_2NH_2$ group in the vicinity of 1386 $cm^{-1}$ appeared, i.e. the polymer (ii) was formed.

(Step (B))

10 g of the polymer (ii) obtained in the above step (A) and 190 g of N,N-dimethylacetamide (DMAc) dehydrated by means of molecular sieves 4A were put into a 500 mL flask equipped with a stirrer, a thermometer, a Dimroth condenser and a dropping funnel, and heated to 120° C. under nitrogen sealing to dissolve the polymer (ii). The polymer solution after the dissolution was a slightly yellow transparent liquid. Then, the polymer solution in the flask was cooled to room temperature, and then, 10.66 g of the compound (a) was charged from the dropping funnel. No heat generation in the reaction system was observed at that time. Here, the molar ratio of the —$SO_2NH_2$ group in the charged compound (a) and the polymer (ii) was 4:1. Then, 4.65 g of N,N'-tetramethylethylenediamine (hereinafter referred to as TMEDA) was charged from the dropping funnel. Along with the dropwise addition, heat generation in the reaction system was observed. Here, during the charging of the compound (a) and TMEDA, the liquid temperature in the flask was maintained at from 18 to 22° C. Then, heating was conducted by means of an oil bath, and the reaction was carried out for 18 hours, while maintaining the liquid temperature in the flask at from 58 to 60° C. Along with the progress of the reaction, the viscosity of the reaction solution gradually increased but not so much as to prevent stirring, and the solution remained to be a uniform yellow liquid with no formation of gel observed.

To the solution before the reaction (the solution having the polymer (ii) dissolved in DMAc) and the obtained reaction solution, hexafluorobenzene was added in a very small amount as a standard liquid (−162.5 ppm), and $^{19}F$-NMR was measured. With the obtained reaction solution, a peak attributable to $CF_2$—$SO_2NH_2$ in the vicinity of −116.2 ppm as observed with the solution before the reaction, disappeared, and peaks attributable to —$CF_2$—$SO_2N^-M_\alpha^+$ $SO_2CF_2CF_2$—$SO_2F$ ($M_\alpha^+$ is considered to be an ammonium salt derived from TMEDA) in the vicinity of −104.0 ppm, −115.3 ppm and in the vicinity of −110.6 ppm, appeared, whereby formation of the polymer (iii) was confirmed.

(Step (D))

The reaction solution containing the polymer (iii) obtained in the above step (B) was cast on a glass petri dish, dried for 4 hours on a hot plate set at 80° C., and then, dried under reduced pressure for 2 hours in a vacuum drier at 80° C., to obtain a polymer membrane having a thickness of about 250 μm. By repeating an operation of immersing the polymer membrane in ultrapure water at 80° C. for 15 minutes twice, the polymer membrane was washed and then dried under reduced pressure for 1 hour in a vacuum drier at 80° C.

The polymer membrane was analyzed by an infrared spectroscopic analysis, whereby it was confirmed that a peak attributable to a $SO_2NH_2$ group of the polymer (ii) in the vicinity of 1386 $cm^{-1}$ completely disappeared, and instead, a peak attributable to a $SO_2N^-M_\alpha^+SO_2$ group in the vicinity of 1348 $cm^{-1}$ and a peak attributable to a $SO_2F$ group in the vicinity of 1460 $cm^{-1}$ appeared. Namely, it was confirmed that the polymer constituting the polymer membrane was the polymer (iii) having a —$CF_2$—$SO_2N^-M_\alpha^+$ $SO_2CF_2CF_2SO_2F$ group. The dynamic viscoelasticity of the polymer membrane was measured, whereby the softening temperature (tan δ) was 162° C.

(Step (C))

The polymer membrane obtained in the above step (D) was immersed for 30 minutes in a 3N hydrochloric acid aqueous solution at 80° C., and then, immersed for 15 minutes in ultrapure water at 80° C. The cycle of immersing in the hydrochloric acid aqueous solution and immersing in ultrapure water was repeated in a total of 5 times, and then, washing with ultrapure water was repeated until the pH of water in which the polymer membrane was immersed, became 7. The polymer membrane was sandwiched between filter papers and air-dried for 3 hours, then dried for 15 hours in a nitrogen stream in an inert oven at 60° C., and then, dried under reduced pressure for 9 hours in a vacuum drier at 60° C.

The polymer membrane was analyzed by an infrared spectroscopic analysis, whereby it was confirmed that a peak attributable to a $SO_2NHSO_2$ group in the vicinity of 1347 $cm^{-1}$ and a peak attributable to a $SO_2F$ group in the vicinity of 1460 $cm^{-1}$ appeared. Thus, it was confirmed that the polymer constituting the polymer membrane was a polymer (vi) having a —$CF_2$—$SO_2N^-H^+SO_2CF_2CF_2SO_2F$ group. The dynamic viscoelasticity of the polymer membrane was measured, whereby the softening temperature (tan δ) was 118° C.

(Step (E))

The polymer membrane obtained in the above step (C) was, in a state sandwiched between PTFE sheets having a thickness of 0.1 µm, subjected to thermal treatment for 60 minutes in an oven set at 150° C. The color of the membrane was slightly brown.

(Step (F))

The polymer membrane obtained in the above step (E) was immersed for 60 hours at 80° C. in an alkaline aqueous solution (potassium hydroxide: 15 mass %, dimethyl sulfoxide: 30 mass %, and water: 55 mass %), and then, washed with water until the pH of washing water became 7. Then, the membrane was immersed in a 10 mass % hydrogen peroxide aqueous solution and treated at 80° C. for 20 hours. By this operation, the slightly brown color of the membrane became colorless transparent. Further, the membrane was immersed for 30 minutes in a 3N hydrochloric acid aqueous solution at 80° C., and then, immersed for 15 minutes in ultrapure water at 80° C. The cycle of immersing in the hydrochloric acid aqueous solution and immersing in ultrapure water was repeated in a total of 5 times, and then, washing with ultrapure water was repeated until the pH of ultrapure water wherein the polymer membrane was immersed, became 7.

The polymer membrane was analyzed by an infrared spectroscopic analysis, whereby it was confirmed that a peak attributable to a $SO_2F$ group in the vicinity of 1460 $cm^{-1}$ disappeared, and a peak attributable to a $SO_3H$ group in the vicinity of 1036 $cm^{-1}$ appeared. Thus, it was confirmed that the polymer constituting the polymer membrane was a polymer (v) having a —$CF_2$—$SO_2N^-H^+SO_2CF_2$—$CF_2$—$SO_3^-H^+$ group.

By conducting the above steps (A), (B), (D), (C), (E) and (F), the ionic polymer membrane was obtained.

Figure 3:
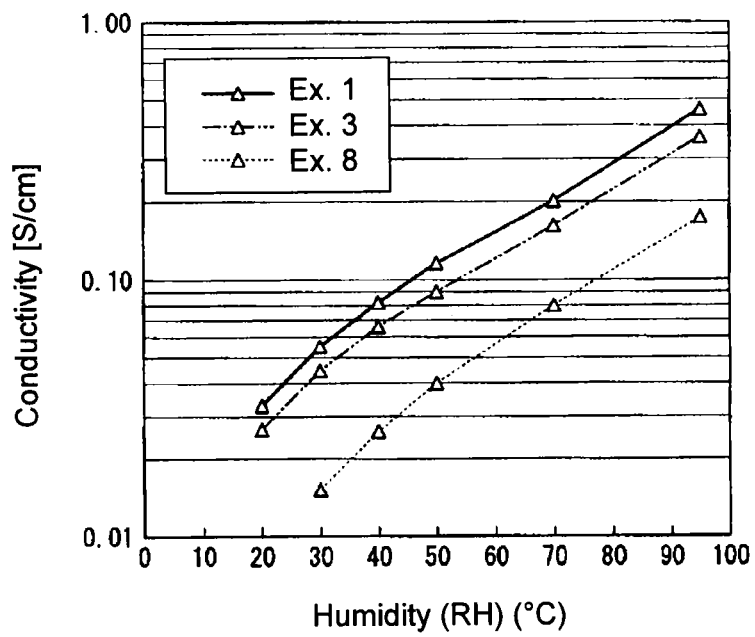
FIG. 3 is a graph showing the relation between humidity and conductivity of ionic polymer membranes in Ex. 1, 3 and 8.

The dynamic viscoelasticity of the ionic polymer membrane was measured, whereby the softening temperature (tan δ) was 138° C. The conductivity of the ionic polymer membrane was measured, whereby the conductivity at 80° C. under a RH of 50% was 0.114 S/cm. The water uptake of the ionic polymer membrane was 121%. The results are shown in Table 1. The relation between the humidity and the conductivity of the ionic polymer membrane is shown in FIG. 3. The relation between the conductivity and the water uptake of the ionic polymer membrane is shown in Table 4.

Ex. 2

An ionic polymer membrane was obtained in the same manner as in Ex. 1 except that the steps (C) and (E) were not conducted.

Figure 5:
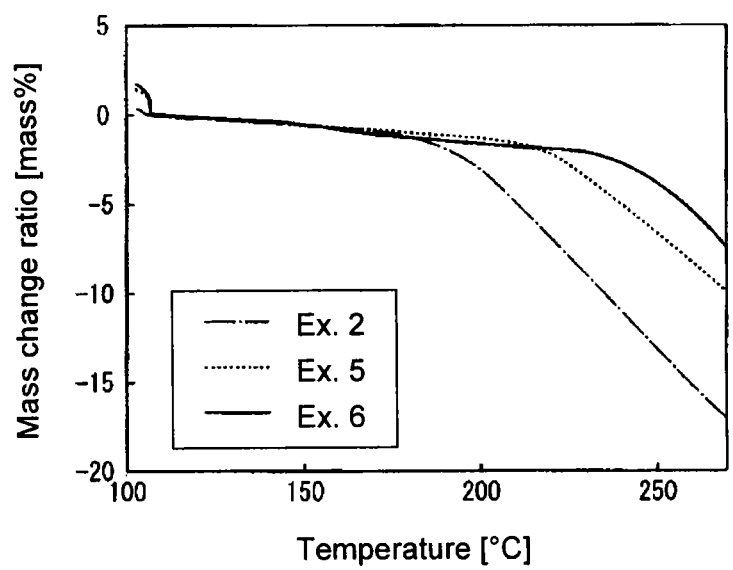
FIG. 5 is a graph showing the decomposition behavior in TG-DTA measurements of ionic polymer membranes in Ex. 2, 5 and 6.

The dynamic viscoelasticity of the ionic polymer membrane was measured, whereby the softening temperature (tan δ) was 146° C. The conductivity of the ionic polymer membrane was measured, whereby the conductivity at 80° C. under a RH of 50% was 0.112 S/cm. The water uptake of the ionic polymer membrane was 247%. The results are shown in Table 1. The relation between the conductivity and the water uptake of the ionic polymer membrane is shown in Table 4. The thermal mass measurement of the ionic polymer membrane was conducted, and the mass reduction ratio against the temperature was measured. The results are shown in FIG. 5.

Ex. 3

The ionic polymer membrane obtained in Ex. 2 was sandwiched between PTFE sheets having a thickness of 0.1 µm and subjected to thermal treatment for 60 minutes in an oven set at 150° C. By the thermal treatment, the color of the polymer membrane which was transparent, was changed to slightly brown. Then, the membrane was immersed in a 10% hydrogen peroxide aqueous solution and treated at 80° C. for 20 hours. By this operation, the color of the polymer membrane which was slightly brown, became colorless transparent. The membrane was further immersed for 30 minutes in a 3N hydrochloric acid aqueous solution at 80° C., and then, immersed for 15 minutes in ultrapure water at 80° C. The cycle of immersing in the hydrochloric acid aqueous solution and immersing in ultrapure water, was repeated in a total of twice, and then, washing with ultrapure water was repeated until the pH of ultrapure water in which the polymer membrane was immersed, became 7.

The dynamic viscoelasticity of the ionic polymer membrane was measured, whereby the softening temperature (tan δ) was 135° C. The conductivity of the ionic polymer membrane was measured, whereby the conductivity at 80° C. under a RH of 50% was 0.091 S/cm. The water uptake of the ionic polymer membrane was 97%. The results are shown in Table 1. The relation between the humidity and the conductivity of the ionic polymer membrane is shown in Table 3. The relation between the conductivity and the water uptake of the ionic polymer membrane is shown in Table 4.

Ex. 4

An ionic polymer membrane was obtained in the same manner as in Ex. 3 except that instead of the thermal treatment at 150° C. for 60 minutes, thermal treatment at 185° C. for 30 minutes was conducted.

The conductivity of the ionic polymer membrane was measured, whereby the conductivity at 80° C. under a RH of 50% was 0.075 S/cm. The water uptake of the ionic polymer membrane was 70%. The results are shown in Table 1. The relation between the conductivity and the water uptake of the ionic polymer membrane is shown in Table 4.

Ex. 5

The ionic polymer membrane obtained in Ex. 2 was dried for 48 hours in a nitrogen stream in a glove box, whereupon the mass of the ionic polymer membrane was measured and found to be 0.7630 g. In a closed container made of PFA, 6.68 mL of a cerium nitrate ($Ce(NO_3)_3$) aqueous solution (cerium concentration: 9.21 mmol/L) was added and diluted with ultrapure water so that the amount of the solution became 100 mL, and in such a diluted cerium nitrate aqueous solution, the ionic polymer membrane was immersed and left to stand still at room temperature for 64 hours. Then, the ionic polymer membrane was quickly washed in 100 mL of ultrapure water, then sandwiched between filter paper sheets to remove attached water and dried for 3 hours in a nitrogen stream in an inert oven set at 40° C.

The dynamic viscoelasticity of the cerium ion-substituted ionic polymer membrane was measured, whereby the softening temperature (tan δ) was 150° C. The thermal mass measurement of the cerium ion-substituted ionic polymer membrane was conducted, and the mass reduction ratio against the temperature was measured. The results are shown in FIG. 5.

The cerium ion-substituted ionic polymer membrane was sandwiched between PTFE sheets having a thickness of 0.1 µm and subjected to thermal treatment for 30 minutes in an oven set at 185° C. By the thermal treatment, the color of the polymer membrane which was transparent, was changed to slightly dark brown. Then, the membrane was immersed in a 10 mass % hydrogen peroxide aqueous solution and treated at 80° C. for 16 hours. By this operation, the color of the polymer membrane which was brownish, became colorless transparent. The membrane was further immersed for 30 minutes in a 3N hydrochloric acid aqueous solution at 80° C., and then, immersed for 15 minutes in ultrapure water at 80° C. The cycle of immersing in the hydrochloric acid aqueous solution and immersing in ultrapure water, was repeated in a total of 7 times to remove cerium ions substituted in the polymer membrane. Then, washing with ultrapure water was repeated until the pH of ultrapure water in which the polymer membrane was immersed, became 7.

The conductivity of the ionic polymer membrane was measured, whereby the conductivity at 80° C. under a RH of 50% was 0.102 S/cm. The water uptake of the ionic polymer membrane was 92%. The results are shown in Table 1. The relation between the conductivity and the water uptake of the ionic polymer membrane is shown in Table 4.

Ex. 6

A cerium ion-substituted ionic polymer membrane was obtained in the same manner as in Ex. 5 except that the mass of the ionic polymer membrane obtained in Ex. 2 was changed to 0.6687 g and the amount of the cerium nitrate ($Ce(NO_3)_3$) aqueous solution (cerium concentration: 9.21 mmol/L) was changed to 11.71 mL. The thermal mass measurement of the cerium ion-substituted ionic polymer membrane was conducted, and the mass reduction ratio against the temperature was measured. The results are shown in FIG. 5.

Ex. 7

The ionic polymer membrane obtained in Ex. 2 was finely cut to prepare 2 g of polymer fragments, to which 13.3 g of a mixed solvent of ethanol and water (ethanol/water=82/18 mass ratio) was added, followed by heating and stirring at 120° C. for 2 hours by means of an autoclave. Then, 4.0 g of water was added, followed by further heating and stirring for 1 hour, to obtain a liquid composition having the polymer dispersed in the dispersant. The liquid composition had a polymer concentration of 9.93 mass % and a dispersant composition of ethanol/water=63/37 (mass ratio).

0.0132 g of cerium carbonate ($Ce_2(CO_3)_3$) and 5.43 g of the liquid composition were stirred for 96 hours at room temperature in a screw bottle by means of a magnetic stirrer to have cerium carbonate dissolved in the liquid composition. The obtained liquid was cast on a petri dish and dried for 1 hour on a hot plate set at 60° C., then for 1 hour in an inert oven set at 40° C. and for 2 hours in a vacuum drier set at 40° C., to obtain a polymer membrane.

The obtained polymer membrane was sandwiched between PTFE sheets having a thickness of 0.1 μm and subjected to thermal treatment for 30 minutes in an oven set at 170° C. By the thermal treatment, the color of the membrane which was transparent, was changed to slightly dark brown. Then, the membrane was immersed in a 10 mass % hydrogen peroxide aqueous solution and treated at 80° C. for 16 hours. By this operation, the color of the polymer membrane which was brownish, became colorless transparent. The membrane was further immersed for 30 minutes in a 3N hydrochloric acid aqueous solution at 80° C., and then, immersed for 15 minutes in ultrapure water at 80° C. The cycle of immersing in the hydrochloric acid aqueous solution and immersing in ultrapure water, was repeated in a total of 7 times to remove cerium ions substituted in the polymer membrane. Then, washing with ultrapure water was repeated until the pH of ultrapure water in which the polymer membrane was immersed, became 7.

The conductivity of the ionic polymer membrane was measured, whereby the conductivity at 80° C. under a RH of 50% was 0.101 S/cm. The water uptake of the ionic polymer membrane was 97%. The results are shown in Table 1.

Ex. 8

Figure 4:
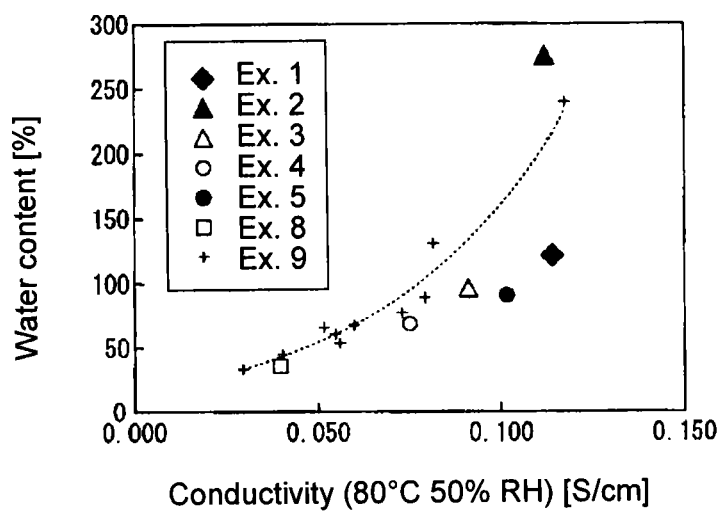
FIG. 4 is a graph showing the relation between conductivity and water uptake of ionic polymer membranes in Ex. 1 to 5, 8 and 9.

The polymer (i) was formed into a polymer membrane, and subjected to hydrolysis treatment and acid treatment and then subjected to thermal treatment at 160° C. for 30 minutes, to obtain an ionic polymer membrane. The relation between the humidity and the conductivity of the ionic polymer membrane is shown in FIG. 3. The relation between the conductivity and the water uptake of the ionic polymer membrane is shown in FIG. 4.

Ex. 9

With respect of a polymer obtainable by polymerizing TFE with a monomer represented by the formula (m1), a plurality of polymer samples were synthesized wherein the content of a —$SO_2F$ group was optionally varied within a range of from 0.4 to 1.6 mmol/g, and the respective polymers were contacted with fluorine gas and fluorinated to obtain stabilized polymers (i).

With respect to the respective polymers (i), ionic polymer membranes were obtained in the same manner as in Ex. 8.

With respect to the ionic polymer membranes obtained in Ex. 9, the relation between the conductivity and the water uptake of each membrane is shown in FIG. 4. Such a correlation is observed that as the conductivity increases, the water uptake rapidly increases.

Ex. 10

An ionic polymer membrane was obtained in the same manner as in Ex. 3 except that instead of the thermal treatment at 150° C. for 60 minutes under no humidification, thermal treatment at 160° C. for 300 minutes under no humidification was conducted. The conductivity of the ionic polymer membrane was measured, whereby the conductivity at 80° C. under a RH of 50% was 0.047 S/cm.

An ionic polymer membrane was obtained in the same manner as in Ex. 3 except that instead of the thermal treatment at 150° C. for 60 minutes under no humidification, thermal treatment at 160° C. for 300 minutes under humidification (relative humidity: 60%) was conducted. The conductivity of the ionic polymer membrane was measured, whereby the conductivity at 80° C. under a RH of 50% was 0.112 S/cm.

TABLE 1

| | Conductivity [S/cm] (80° C. 50% RH) | Water uptake [%] |
|---|---|---|
| Ex. 1 | 0.114 | 121 |
| Ex. 2 | 0.112 | 274 |
| Ex. 3 | 0.091 | 97 |
| Ex. 4 | 0.075 | 70 |
| Ex. 5 | 0.102 | 92 |
| Ex. 7 | 0.101 | 97 |

As shown in FIG. 3 and Table 1, the ionic polymer membrane in Ex. 1 produced via the steps (C) and (E), has a high conductivity, while the ionic polymer membranes in Ex. 3, 4, 5 and 7 produced without via the steps (C) and (E), have low conductivities.

As shown in FIG. 4 and Table 1, it is evident that the ionic polymer membrane in Ex. 1 produced via the steps (C) and (E), has excellent characteristics such that it attains both a high conductivity and a low water uptake, as compared with the ionic polymer membranes produced without via the steps (C) and (E).

In Ex. 1, it was possible to obtain an ionic polymer membrane having preferred characteristics as e.g. an electrolyte membrane for a polymer electrolyte fuel cell, via the steps (C) and (E).

As shown in FIG. 5, it is evident that at the time of conducting thermal treatment of an ionic polymer membrane, if the thermal treatment is carried out after substituting part of $H^+$ in the group (5) by cerium ion, there is an effect to reduce the thermal decomposition of pendant groups in the polymer. From a comparison of conductivities after actually conducting thermal treatment, it is evident that as compared with Ex. 4 wherein no substitution by cerium ion was conducted, in Ex. 5 wherein the thermal treatment was conducted in such a state as substituted by cerium ion, in spite of the thermal treatment at the same temperature as in Ex. 4, thermal decomposition is prevented, and a relatively high conductivity is shown.

From the results in Ex. 10, it is evident that humidification at the time of thermal treatment of an ionic polymer membrane brings about an effect to reduce thermal decomposition of pendant groups in the polymer. Namely, if thermal treatment of an ionic polymer membrane is conducted under humidification, the conductivity becomes to be substantially the same as the conductivity of the ionic polymer membrane in Ex. 1, and decomposition of pendant groups in the polymer does not substantially occur.

On the other hand, it is evident that if thermal treatment of an ionic polymer membrane is conducted under no humidification, the conductivity becomes to be close to the conductivity of the ionic polymer membrane in Ex. 8, and many pendant groups in the polymer undergo thermal decomposition.

INDUSTRIAL APPLICABILITY

The ionic polymer membrane obtained by the production method of the present invention may be used as e.g. an electrolyte membrane or a catalyst layer for a polymer electrolyte fuel cell having a high ion exchange capacity and a low water uptake, and is useful for a membrane/electrode assembly for a polymer electrolyte fuel cell.

This application is a continuation of PCT Application No. PCT/JP2013/079635, filed on Oct. 31, 2013, which is based upon and claims the benefit of priority from Japanese Patent Application No. 2012-250143 filed on Nov. 14, 2012. The contents of those applications are incorporated herein by reference in their entireties.

REFERENCE SYMBOLS

10: membrane/electrode assembly
11: catalyst layer
12: gas diffusion layer
13: anode
14: cathode
15: electrolyte membrane
16: interlayer

What is claimed is:

1. A method for producing an ionic polymer membrane comprising the following steps (A) to (F):
   (A) a step of converting a group represented by the following formula (1) in a polymer (i) having a constituent unit having the group represented by the formula (1), to a group represented by the following formula (2) to form a polymer (ii),
   (B) a step of reacting the polymer (ii) with a compound represented by the following formula (a) to convert the group represented by the formula (2) in the polymer (ii) to a group represented by the following formula (3) to form a polymer (iii),
   (C) a step of converting the group represented by the formula (3) in the polymer (iii) to a group represented by the following formula (4) to form a polymer (iv),
   (D) a step of forming a polymer membrane which contains the polymer (i), prior to the step (A), or
   forming a polymer membrane which contains the polymer (ii), between the step (A) and the step (B), or
   forming a polymer membrane which contains the polymer (iii), between the step (B) and the step (C), or
   forming a polymer membrane which contains the polymer (iv), between the step (C) and the following step (E),
   (E) a step of thermally treating the polymer membrane containing the polymer (iv), subsequent to the step (C) and between the step (D) and the following step (F),
   (F) a step of converting the group represented by the formula (4) in the polymer (iv) to a group represented by the following formula (5) to form a polymer (v), thereby to obtain an ionic polymer membrane which contains the polymer (v);

  (1)

  (2)

  (a)

  (3)

  (4)

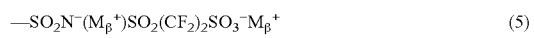  (5)

wherein each of $Z^1$ and $Z^2$ which are independent of each other, is a group selected from the group consisting of a hydrogen atom, a monovalent metal element and $Si(R)_3$,
   R is a hydrogen atom, or a $C_{1-12}$ monovalent organic group which may have an etheric oxygen atom, and three R may be the same or different groups one another,
   $M_\alpha^+$ is a monovalent metal cation, or a monovalent cation derived from an organic amine, and
   $M_\beta^+$ is an hydrogen ion, a monovalent metal cation, or a monovalent cation derived from an organic amine.

2. The method for producing an ionic polymer membrane according to claim 1, wherein the group represented by the formula (2) is —$SO_2NH_2$.

3. The method for producing an ionic polymer membrane according to claim 1, wherein in the step (B), the amount of the compound (a) to be used, is from 0.5 to 20 by molar ratio to the group represented by the formula (2) in the polymer (ii).

4. The method for producing an ionic polymer membrane according to claim 1, wherein in the step (E), the polymer membrane is thermally treated at a temperature of at most 160° C.

5. The method for producing an ionic polymer membrane according to claim 1, wherein the polymer (i) is a perfluoropolymer.

6. A method for producing a catalyst layer for a polymer electrolyte fuel cell, wherein the catalyst layer is produced as an ionic polymer membrane by the method for producing an ionic polymer membrane as defined in claim 1.

7. A method for producing an electrolyte membrane for a polymer electrolyte fuel cell, wherein the electrolyte membrane is produced as an ionic polymer membrane by the method for producing an ionic polymer membrane as defined in claim 1.

8. The method for producing an electrolyte membrane for a polymer electrolyte fuel cell according to claim 7, wherein the electrolyte membrane further contains at least one type of atoms selected from the group consisting of cerium and manganese.

9. A method for producing a membrane/electrode assembly for a polymer electrolyte fuel cell, which comprises an anode having a catalyst layer, a cathode having a catalyst layer, and an electrolyte membrane disposed between the anode and the cathode, wherein either one or each of the electrolyte membrane and the catalyst layers, is formed as an ionic polymer membrane by the method for producing an ionic polymer membrane as defined in claim 1.

* * * * *